United States Patent Office 3,816,422
Patented June 11, 1974

3,816,422
2,3-DIHYDRO-OXO-IMIDAZO[1,2-a]PYRIMIDINES AND SALTS THEREOF
Helmut Stahle, Herbert Köppe, and Werner Kummer, Ingelheim am Rhein, and Wolfgang Hoefke, Budenheim, Germany, assignors to Boehringer Ingelheim GmbH, Ingelheim am Rhein, Germany
Claims priority, application Germany, July 8, 1971,
P 21 33 998.0
No Drawing. Filed June 30, 1972, Ser. No. 268,215
Int. Cl. C07d 51/46
U.S. Cl. 260—256.4 F        3 Claims

ABSTRACT OF THE DISCLOSURE

Compounds of the formula

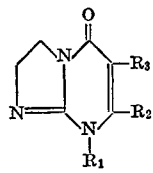

or

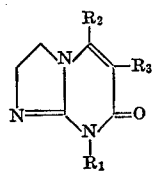

wherein $R_1$ is

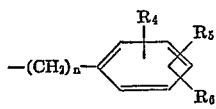

where
n is 0 or 1, and
$R_4$, $R_5$ and $R_6$, which may be identical to or different from each other, are each methyl, ethyl, fluorine, chlorine, hydrogen, bromine, trifluoromethyl, cyano or methoxy
one of $R_2$ and $R_3$ is

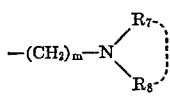

where
m is an integer from 0 to 3, inclusive,
$R_7$ is hydrogen or lower alkyl,
$R_8$ is lower alkyl, and
$R_7$ and $R_8$, together with each other and the nitrogen atom to which they are attached, are piperidino, piperazino, morpholino or pyrrolidino,
and the other of $R_2$ and $R_3$ is methyl or ethyl, and their non-toxic, pharmacologically acceptable acid addition salts; the compounds as well as the salts are useful as regulators of the central nervous system and especially as hypotensives.

This invention relates to novel 2,3-dihydro-oxo-imidazo-[1,2-a]pyrimidines and acid addition salts thereof, as well as to a method of preparing these compounds.

More particularly, the present invention relates to a novel class of imidazo[1,2-a]pyrimidines represented by the formulas

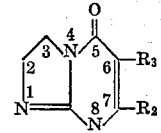

(I)

and

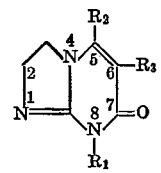

(Ia)

wherein $R_1$ is

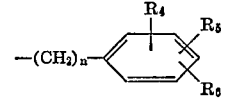

where
n is 0 or 1, and
$R_4$, $R_5$ and $R_6$, which may be identical to or different from each other, are each methyl, ethyl, fluorine, chlorine, hydrogen, bromine, trifluoromethyl, cyano or methoxy
one of $R_2$ and $R_3$ is

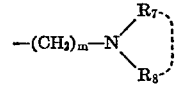

where
m is an integer from 0 to 3, inclusive,
$R_7$ is hydrogen or lower alkyl,
$R_8$ is lower alkyl, and
$R_7$ and $R_8$, together with each other and the nitrogen atom to which they are attached, are piperidino, piperazino, morpholino or pyrrolidino,
and the other of $R_2$ and $R_3$ is methyl or ethyl, and their non-toxic, pharmacologically acceptable acid addition salts.

The compounds embraced by formulas I and Ia may be prepared by a number of different methods, among which the following have proved to be particularly convenient and efficient:

METHOD A

By reacting a 2-amino-imidazoline-(2) of the formula

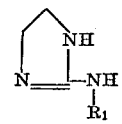

(II)

wherein $R_1$ has the same meanings as in formulas I and Ia, with an acrylic acid derivative of the formula $$Y-\underset{R_2}{C}=\underset{R_3}{C}-\underset{O}{\overset{\|}{C}}-X$$

(III)

wherein
$R_2$ and $R_3$ have the same meanings as in formulas I and Ia, and
X and Y, which may be identical to or different from each other, are each chlorine, bromine, iodine, alkoxy of 1 to 4 carbon atoms, (alkyl of 1 to 4 carbon atoms)-thio, amino, (alkyl of 1 to 4 carbon atoms)-amino or (di-alkyl of 1 to 4 carbon atoms)-amino.

It is well known that, in the case of reactions on ambivalent bis-nucleophile systems, the solvent which is used exerts a decisive influence upon the course of the reaction. In the present case, therefore, depending upon the choice of the solvent medium for the reaction between compounds II and III, it is possible to selectively prepare either a compound of the formula I or a compound of the formula Ia. Thus, for example, the reaction of a 2-amino-imidazoline-(2) of the formula II with an α-chloro-β-chloro-carbonylene-amine of the formula III in a polar, protic solvent medium, such as methanol, leads to a 5-oxo-imidazo[1,2-a]pyrimidine of the formula I, whereas the same reaction in a non-polar or polar aprotic solvent medium, such as benzene, yields the isomeric 7 - oxo-imidazo[1,2-a]pyrimidine of the formula Ia.

Depending upon the meaning of X and Y in the acrylic acid derivative of the formula III, the reaction may also be performed without a solvent.

The structure of the end products may readily be elucidated by mass-spectrometry, based on the different and for each type specific fragmentation, as well as by evaluation of their IR- and NMR-spectra. For instance, the 5-oxo-imidazo[1,2-a]pyrimidines

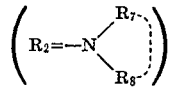

exhibit bands at 1610 cm.$^{-1}$ and 1640 cm.$^{-1}$ which are characteristic for the range of polar valence oscillations $>CO$ and $>C=C<$, whereas the isomeric 7-oxo-compounds

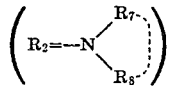

exhibit bands at 1575 cm.$^{-1}$ and 1620 cm.$^{-1}$.

The optimum reaction temperatures depend, on the one hand, upon the nature and reactivity of the substituents X and Y in the acrylic acid derivative of the formula III and, on the other hand, upon whether $R_1$ in the 2-amino-imidazoline-(2) of the formula II is a phenyl or benzyl radical. Quite generally, the operative temperature range for this method is from —5 to 170° C., where the reaction with a 2-phenylamino-imidazoline-(2) requires temperatures in the upper portion of this range, while lower temperatures suffice for the reaction with a 2 - benzyl-amino-imidazoline.

Normally, the reactions go to completion within a relatively short period of time, many of them within about 15 to 60 minutes.

METHOD B

For the preparation of a compound of the formula I wherein $R_2$ is methyl, by reacting a 2-amino-imidazoline-(2) of the formula II with a lower alkyl α-(amino-alkyl)-aceto-acetate of the formula

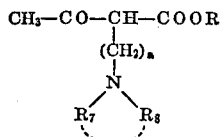

(IV)

wherein

R is lower alkyl, especially ethyl,
a is 2 or 3, and
$R_7$ and $R_8$ have the same meanings as in formula I.

The starting compounds required for methods A and B are known compounds and are commercially readily available.

For instance, compounds of the formula III are described by Buyle et al. in Tetrahedron, 24, 4217 (1968), and Tetrahedron, 25, 3453 (1969); as well as by A. G. Cook in his book entitled *Enamines: Synthesis, Structure and Reactions*, published by Marcel Dekker, New York and London, edition of 1969.

Likewise, compounds of the formula IV are described by H. J. Gais et al. in Helv. Chim. Acta, 52, Fasc. 8 (1969), 2641.

The compounds embraced by formula I are organic bases and therefore form acid addition salts with inorganic or organic acids. Examples of non-toxic, pharmacologically acceptable acid addition salts are those formed with hydrochloric acid, hydrobromic acid, hydroiodic acid, acetic acid, propionic acid, butyric acid, caproic acid, capric acid, valeric acid, isovaleric acid, oxalic acid, malonic acid, succinic acid, maleic acid, fumaric acid, lactic acid, tartaric acid, citric acid, malic acid, benzoic acid, p-hydroxy-benzoic acid, p-amino-benzoic acid, phthalic acid, cinnamic acid, salicylic acid, ascorbic acid, methanesulfonic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

6 - Ethyl - 8 - (4' - chloro - 2' - methyl-phenyl) - 5- 5 - dimethylamino - 2,3 - dihydro - 7 - oxo-imidazo-[1,2-a]pyrimidine by method A 5 gm. (0.024 mol) of 2-[(4'-chloro-2'-methyl-phenyl)-amino]-2-imidazoline were dissolved, together with 10 ml. of triethylamine, in 250 ml. of absolute benzene, and the solution was heated to reflux temperature. While thoroughly stirring the hot solution, a mixture consisting of 5 gm. (105% of the stoichiometrically required amount) of α-ethyl-β-chloro-β-dimethylamino-acryloyl chloride and 100 ml. of absolute benzene was added dropwise over a period of 15 minutes, and the resulting mixture was refluxed for about ten minutes more. Thereafter, the reaction mixture was evaporated to dryness in a rotary dryer, the residue was dissolved in dilute (about 1 N) hydrochloric acid, and the resulting solution was extracted several times with ether, whereby impurities dissolve in the ether phase. The ether extracts were discarded, the aqueous phase was treated with activated charcoal and was then made alkaline with dilute sodium hydroxide, and the precipitate formed thereby was collected by vacuum filtration, washed with water and dried: 3.8 gm. (47.7% of theory) of the thin-layer chromatographically pure compound of the formula

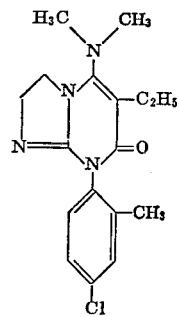

having a melting point of 215° C. were obtained.

EXAMPLE 2

6-Ethyl-8-(2',6'-dichloro-phenyl)-5-morpholino-2,3-dihydro-7-oxo-imidazo[1,2-a]pyrimidine by method A 4.6 gm. (0.02 mol) of 2-[(2',6'-dichloro-phenyl)-amino]-2-imidazoline were dissolved, together with 5 ml. of triethylamine, in 250 ml. of absolute benzene, and the solution was heated to reflux temperature. While stirring the hot solution, a mixture consisting of 5 gm. (110% of the stoichiometrically required amount) of α-ethyl-β-chloro-β-morpholino-acryloyl chloride and 50 ml. of absolute benzene was added dropwise over a period of 15 minutes, and the resulting mixture was stirred for some additional time. Thereafter, the reaction mixture was evaporated to dryness in vacuo, the solid residue was dissolved in dilute hydrochloric acid, and the acidic solution was extracted several times with ether. The ethereal extracts were discarded, but the aqueous phase was treated with activated charcoal and was then made alkaline with dilute sodium hydroxide. The precipitate formed thereby was collected by vacuum filtration, washed with water and dried in a vacuum drying chamber, yielding 5.1 gm. (65.8% of theory) of the compound of the formula

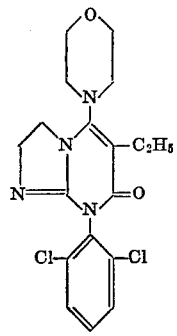

which had a melting point of 299–300° C. The product was analytically pure and behaved thin-layer chromatographically uniform in a plurality of chromatographic systems.

EXAMPLE 3

Using a procedure analogous to that described in Example 1, 6 - ethyl-8-(2′,6′-dichloro-phenyl)-5-dimethylamino - 2,3 - dihydro - 7 - oxo-imidazo[1,2-a]pyrimidine, M.P. 215–216° C., was prepared from 2-[(2′,6′-dichlorophenyl)-amino]-imidazoline-(2) and α-ethyl-β-chloro-β-dimethylamino-acryloyl chloride. The yield was 34% of theory.

EXAMPLE 4

Using a procedure analogous to that described in Example 2, 6 - ethyl - 8 - (2′ - chloro-6′-methyl-phenyl)-5-morpholino - 2,3 - dihydro - 7 - oxo-imidazo[1,2-a]pyrimidine, M.P. 255–256° C. of the formula

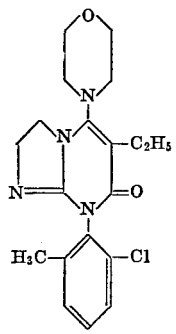

was prepared from 2 - [(2′ - chloro-6′-methyl-phenyl)-amino]-imidazoline-(2) and α-ethyl-β-chloro-β-morpholino-acryloyl chloride. The yield was 42.3% of theory.

EXAMPLE 5

Using a procedure analogous to that described in Example 2, 6 - ethyl - 8 - (2′,6′-diethyl-phenyl)-5-morpholino - 2,3 - dihydro - 7 - oxo-imidazo[1,2-a]pyrimidine, M.P. 136–137° C., was prepared from 2-[(2′,6′-diethyl-phenyl)-amino]-imidazoline-(2) and α-ethyl-β-chloro-β-morpholino-acryloyl chloride. The yield was 31.4% of theory.

EXAMPLE 6

Using a procedure analogous to that described in Example 2, 6 - ethyl - 8 - (2′,6′-dichloro-phenyl)-5-piperidino - 2,3 - dihydro - 7 - oxo-imidazo[1,2-a]pyrimidine, M.P. 256–258° C., of the formula

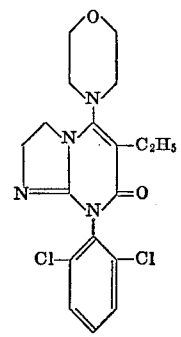

was prepared from 2-[(2′,6′-dichloro-phenyl)-amino]-imidazoline - (2) - and α-ethyl-β-chloro-β-piperidino-acryloyl chloride. The yield was 69% of theory.

EXAMPLE 7

Using a procedure analogous to that described in Example 1, 6-ethyl-8-(2′-trifluoromethyl - phenyl)-5-dimethyl-amino - 2,3 - dihydro-7-oxo-imidazo[1,2-a]pyrimidine, M.P. 145° C., of the formula

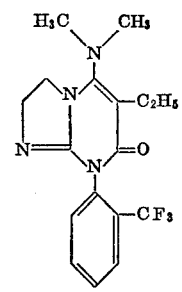

was prepared from 2 - [(2′ - trifluoromethyl - phenyl)-amino]-imidazoline - (2) and α-ethyl - β - dimethylamino-acryloyl chloride. The yield was 41% of theory.

EXAMPLE 8

6-Ethyl - 8 - (4′ - chloro-2′-methyl-phenyl)-7-dimethyl-amino-2,3-dihydro - 5 - oxo-imidazo[1,2-a]pyrimidine by method A 4 gm. (0.019 mol) of 2-[(4′-chloro-2′-methyl-phenyl)-amino]-2-imidazoline were dissolved in a mixture consisting of 8 ml. of triethylamine and 50 ml. of absolute methanol, the resulting solution was cooled to 0° C. and, while stirring and maintaining this temperature by cooling with ice, a mixture consisting of 5 gm. (about 130% of the stoichiometrically required amount) of α-ethyl-β-chloro-β-dimethylamino-acryloyl chloride and 70 ml. of dry chloroform was added dropwise over a period of 45 minutes. Thereafter, the resulting mixture was evaporated to dryness in vacuo, the oily residue was dissolved in dilute 1 N hydrochloric acid, and the acidic solution was extracted several times with ether. The ether extracts were discarded, but the aqueous phase was purified by treatment with activated charcoal and then fractionally extracted with ether at gradually increasing pH-values after buffering with dilute sodium hydroxide. The ethereal extracts which contained the desired product, as determined by thin-layer chromatography, were combined, dried over anhydrous calcium sulfate and evaporated to dryness in vacuo. The initially oily residue crystallized throughout upon standing for some time, yielding 1.7 gm. (27.8% of theory) of the compound of the formula

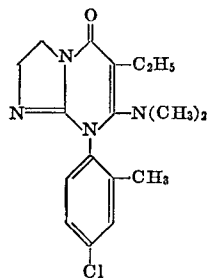

which had a melting point of 101–102° C. and was thin-layer chromatographically pure.

EXAMPLE 9

Using a procedure analogous to that described in Example 8, 25.5% of theory of 6-ethyl-8-(2',6'-dichloro-phenyl) - 7 - dimethylamino-2,3-dihydro-5-oxo-imidazo-[1,2-a]pyrimidine, M.P. 161–162° C., was obtained from α-ethyl-β-chloro - β - dimethylamino-acryloyl chloride and 2-[(2',6'-dichloro-phenyl)-amino]-imidazoline-(2).

EXAMPLE 10

Using a procedure analogous to that described in Example 8, 26.3% of theory of 6-ethyl-8-(2',6'-dichloro-phenyl)-7-morpholino - 2,3 - dihydro-5-oxo-imidazo[1,2-a]pyrimidine, M.P. 208–209° C., was obtained from α-ethyl-β-chloro-morpholino-acryloyl chloride and 2-[(2',6'-dichloro-phenyl)-amino]-imidazoline-(2).

EXAMPLE 11

Using a procedure analogous to that described in Example 8, 55% of theory of 6-ethyl-8-(2',6'-dichloro-phenyl)-7-piperidino - 2,3-dihydro - 5 - oxo-imidazo[1,2-a]pyrimidine, M.P. 198–200° C., was obtained from α-ethyl-β-chloro-β-piperidino - acryloyl chloride and 2-[(2',6'-dichloro-phenyl)-amino]-imidazoline-(2).

EXAMPLE 12

8-(2',6'-Dichloro-phenyl) - 2,3 - dihydro-7-methyl-5-oxo-6 - (β - piperidino-ethyl)-imidazo[1,2-a]pyrimidine by method B A mixture consisting of 6.9 gm. (0.03 mol) of 2-[(2',6'-dichloro - phenyl)-amino]-2-imidazoline and 14 gm. of ethyl α - (2-piperidino-ethyl)acetoacetate was heated at 160–170° C. for four hours, accompanied by stirring. Thereafter, the reaction mixture was allowed to cool and was then admixed with about 200 ml. of ether, and the resulting solution was purified with activated charcoal. The faintly light-brown, purified ethereal solution was placed into a refrigerator, whereupon a slightly yellow, crystalline substance separated out after some time, which was collected by vacuum filtration, washed with ether and dried, yielding 3.3 gm. (27.0% of theory) of the thin-layer chromatographically pure compound of the formula

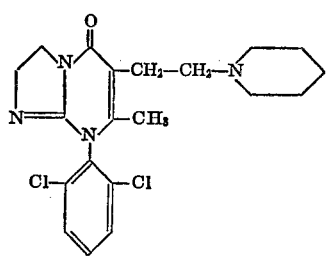

having a melting point of 178–180° C.

EXAMPLE 13

2,3 - Dihydro - 8-(o-methyl-benzyl)-7-methyl-5-oxo-6-(β-piperidino-ethyl)-imidazo[1,2-a]pyrimidine by method B A mixture consisting of 5.7 gm. (0.03 mol) of 2-[(o-methyl-benzyl)-amino]-2-imidazoline, 9.05 gm. (125% of the stoichiometrically required amount) of ethyl α-(2-piperidinoethyl) - acetoacetate and 30 ml. of n-butanol was refluxed (114–118° C.) for three hours. Thereafter, the reaction solution was evaporated to dryness in vacuo, the oily residue was admixed with 200 ml. of ether, and the resulting ethereal solution was purified with activated charcoal and then allowed to stand on an ice bath for several hours. The crystalline precipitate formed thereby was collected by vacuum filtration, washed with ether and dried in a vacuum drying chamber, yielding 5.5 gm. (50.1% of theory) of the compound of the formula

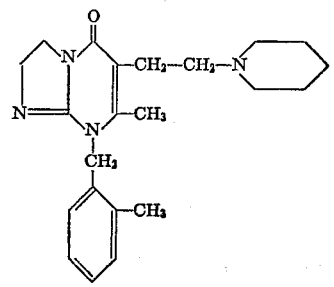

which had a melting point of 125–127° C.

EXAMPLE 14

8 - (2',6' - Dichloro-benzyl)-2,3-dihydro-7-methyl-5-oxo-6 - (β - piperidino-ethyl)-imidazo[1,2-a]pyrimidine by method B A mixture consisting of 6.1 gm. (0.025 mol) of 2-[(2',6'-dichloro-benzyl)-amino]-2-imidazoline, 30 ml. of n-butanol and 9.05 gm. (150% of the stoichiometrically required amount) of ethyl α-(2-piperidino-ethyl)-acetoacetate was heated for three hours at 115° C. Thereafter, the reaction mixture was evaporated to dryness in vacuo, the oily residue was dissolved in about 500 ml. of dilute hydrochloric acid, the acidic solution was extracted several times with ether, and the ethereal extracts were discarded. Subsequently, the aqueous phase was fractionally extracted with ether at gradually increasing pH-values (buffering with dilute sodium hydroxide), and the ether extracts containing the desired compound, as determined by thin-layer chromatography, were combined and dried over anhydrous calcium sulfate. The ether was then evaporated in vacuo in a rotary evaporator, leaving as a residue 2.0 gm. (19.0% of theory) of the pure compound of the formula

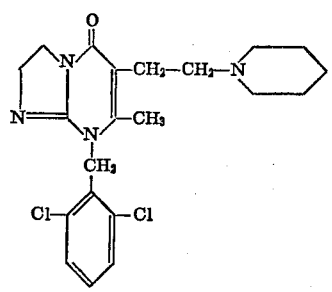

having a melting point of 168–170° C.

EXAMPLE 15

Using a procedure analogous to that described in Example 14, 17% of theory of 2,3-dihydro-5-oxo-6-(β- morpholino-ethyl) - 7 - methyl-8-(2',6'-dichloro-benzyl)-imidazo[1,2-a]pyrimidine, M.P. 165° C., of the formula

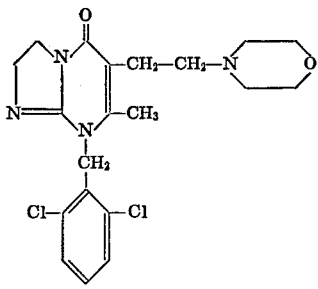

was obtained from 2 - [(2',6'-dichloro-benzyl)-amino]-imidazoline-(2) and ethyl α-(2-morpholino-ethyl)-acetoacetate.

EXAMPLE 16

Using a procedure analogous to that described in Example 12, 12.3% of theory of 2,3-dihydro-5-oxo-6-(β-morpholino-ethyl) - 7 - methyl-8-(2',6'-dichloro-phenyl)-imidazo[1,2-a]pyrimidine, M.P. 173–175° C., was obtained from 2 - [(2',6'-dichloro-phenyl)-amino]-imidazoline-(2) and ethyl α-(2-morpholino-ethyl)-acetoacetate.

EXAMPLE 17

Using a procedure analogous to that described in Example 13, 65% of theory of 2,3-dihydro-5-oxo-6-(β-piperidino-ethyl) - 7-methyl-8-(2'-chloro-benzyl)-imidazo[1,2-a]pyrimidine, M.P. 155–157° C., was obtained from 2-[(2'-chloro-benzyl)-amino]-imidazoline-(2) and ethyl α-(2-piperidino-ethyl)-acetoacetate.

EXAMPLE 18

Using a procedure analogous to that described in Example 13, 37.4% of theory of 2,3-dihydro-5-oxo-6-(β-diethylamino-ethyl) - 7 - methyl - 8-(2'-chloro-benzyl)-imidazo[1,2-a]pyrimidine, M.P. 112–113° C., of the formula

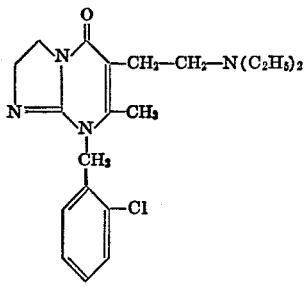

was obtained from 2-[(2'-chloro-benzyl)-amino]-imidazoline-(2) and ethyl α-(2-diethylamino-ethyl)-acetoacetate.

EXAMPLE 19

Using a procedure analogous to that described in Example 15, 26.2% of theory of 2,3-dihydro-5-oxo-6-(β-diethylamino-ethyl) - 7-methyl-8-(2',6'-dichloro-benzyl)-imadazo[1,2-a]pyrimidine, M.P. 101–102° C., was obtained from 2 - [(2',6'-dichloro-benzyl)-amino]-imidazoline -(2) and ethyl α-(2'-diethylamino-ethyl)-acetoacetate.

EXAMPLE 20

Using a procedure analogous to that described in Example 15, 42.5% of theory of 2,3-dihydro-5-oxo-6-(β-diethylamino-ethyl) - 7-methyl-8-(2',6'-dichloro-phenyl)-imidazo[1,2-a]pyrimidine, M.P. 163.5–165.5° C., was obtained from 2 - [(2',6'-dichloro-phenyl)-amino]-imidazoline-(2) and ethyl α-(2'-diethylamino-ethyl)-acetoacetate.

EXAMPLE 21

Using a procedure analogous to that described in Example 13, 41.2% of theory of 2,3-dihydro-5-oxo-6-(β - dimethylamino-ethyl)-7-methyl-8-(2'-chloro-benzyl)-imidazo[1,2-a]pyrimidine, M.P. 121–122° C., was obtained from 2-[(2'-chloro-benzyl)-amino]-imidazoline-(2) and ethyl α-(2-dimethylamino-ethyl)-acetoacetate.

EXAMPLE 22

Using a procedure analogous to that described in Example 13, 47% of theory of 2,3-dihydro-5-oxo-6-(β - pyrrolidino-ethyl)-7-methyl-8-(2'chloro-benzyl)-imidazo[1,2-a]pyrimidine, M.P. 125–127° C., of the formula

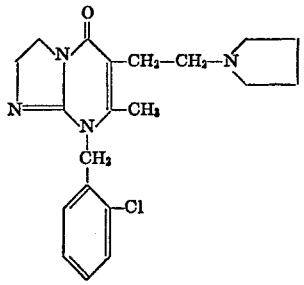

was obtained from 2-[(2'-chloro-benzyl)-amino]-imidazoline-(2) and ethyl α-2'-pyrrolidino-ethyl)-acetoacetate.

EXAMPLE 23

Using a procedure analogous to that described in Example 12, 45.5% of theory of 2,3-dihydro-5-oxo-6-(β - pyrrolidino - ethyl)-7-methyl-8-(p-methoxy-benzyl)-imidazo[1,2-a]pyrimidine, M.P. 82–84° C., of the formula

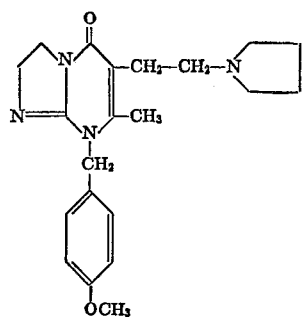

was obtained from 2-[(p-methoxy-benzyl)-amino]-imidazoline-(2) and ethyl α-(2-pyrrolidino-ethyl)-acetoacetate.

EXAMPLE 24

Using a procedure analogous to that described in Example 12, 43% of theory of 2,3-dihydro-5-oxo-6-(β - pyrrolidino-ethyl)-7-methyl-8-(2',6'-diethyl-phenyl)-imidazo[1,2-a]pyrimidine, an oil, M.P. of its picrate: 189–192° C., of the formula

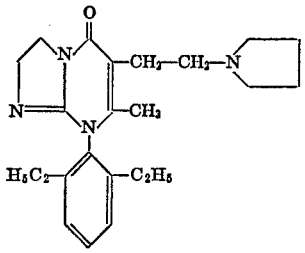

was obtained from 2-[(2',6'-diethyl-phenyl)-amino]-imidazoline-(2) and ethyl α-(2-pyrrolidino-ethyl)-acetoacetate.

EXAMPLE 25

Using a procedure analogous to that described in Example 13, 34% of theory of 2,3-dihydro-5-oxo-6-(γ- piperidino-n-propyl)-7-methyl-8-(2'-chloro-benzyl) - imidazo[1,2-a]pyrimidine, M.P. 97–99° C., of the formula

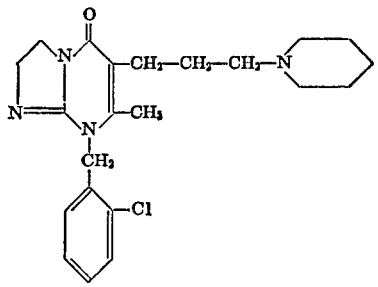

was obtained from 2-[(2'-chloro-benzyl)-amino]-imidazoline(2) and ethyl α-(3-piperidino-n-propyl)-acetoacetate.

EXAMPLE 26

Using a procedure analogous to that described in Example 13, 29% of theory of 2,3-dihydro-5-oxo-6-(γ-piperidino-n-propyl)-7-methyl-8 - benzyl-imidazo[1,2 - a] pyrimidine, an oil, M.P. of its picrate: 203–206° C. (decomp.), of the formula

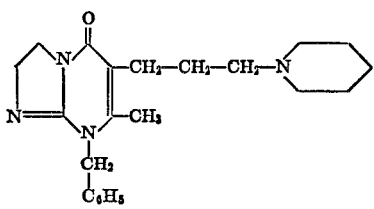

was obtained from 2-(benzyl-amino)-imidazoline-(2) and ethyl α-(3-piperidino-n-propyl)-acetoacetate.

EXAMPLE 27

Using a procedure analogous to that described in Example 12, 90% of theory of 2,3-dihydro-5-oxo-6-(γ-piperidino-n-propyl)-7-methyl-8-(2',6'-dichloro - phenyl)-imidazo[1,2-a]pyrimidine, M.P. 139–140° C., was obtained from 2-[(2',6'-dichloro-phenyl)-amino]-imidazoline-(2) and ethyl α-(3-piperidino-n-propyl)-acetoacetate.

EXAMPLE 28

Using a procedure analogous to that described in Example 2, 39.4% of theory of 6-ethyl-8-(4'-bromo-2',6'-dichloro-phenyl)-5-morpholino-2,3-dihydro - 7 - oxo-imidazo[1,2-a]pyrimidine, M.P. 231–233° C., of the formula

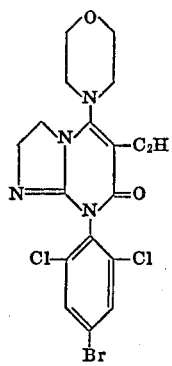

was obtained from 2-[(2',6'-dichloro-4'-bromo-phenyl)-amino]-imidazoline-(2) and α-ethyl-β-chloro-β-morpholino-acryloyl chloride.

EXAMPLE 29

Using a procedure analogous to that described in Example 2, 46% of theory of 6-ethyl-8-(2',5'-difluoro-phenyl)-5-morpholino-2,3-dihydro-7-oxo-imidazo[1,2 - a] pyrimidine, M.P. 238–240° C., of the formula

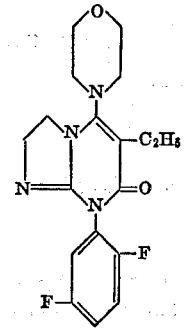

was obtained from 2-[(2',5'-difluoro-phenyl)-amino]-imidazoline-(2) and α-ethyl-β-chloro-β-morpholino-acryloyl chloride.

EXAMPLE 30

Using a procedure analogous to that described in Example 2, 24.7% of theory of 6-ethyl-8-(4'-cyano-phenyl)-5-morpholino - 2,3 - dihydro-7-oxo-imidazo[1,2-a]pyrimidine, M.P. 245–246° C., of the formula

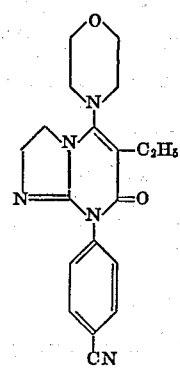

was obtained from 2-[(4'-cyano-phenyl)-amino]-imidazoline-(2) and α-ethyl-β-chloro-β-morpholino-acryloyl chloride.

The compounds according to the present invention, that is, those embraced by formulas I and Ia and their non-toxic, pharmacologically acceptable acid addition salts, have useful pharmacodynamic properties. More particularly, the compounds of the instant invention exhibit a regulatory action upon the central nervous system, especially a hypotensive activity which may or may not be accompanied by an analgesic, sedative or gastric juice secretion inhibiting action, in warm-blooded animals, such as mice, rats, dogs and cats.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective oral dosage unit of the compounds according to the present invention is from 0.0083 to 0.84 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 31

Tablets

The tablet composition is compounded from the following ingredients:

| | Parts |
|---|---|
| 6 - Ethyl - 8 - (2',6' - dichloro-phenyl) - 5 - dimethylamino - 2,3 - dihydro-7-oxo-imidazo[1,2-a]pyrimidine | 15 |
| Lactose | 30 |
| Corn starch | 30 |
| Colloidal silicic acid | 1 |
| Magnesium stearate | 4 |
| Total | 80 |

Preparation.—The imidazopyrimidine compound is intimately admixed with the lactose, the corn starch and the silicic acid, and the mixture is moistened with an aqueous soluble starch paste and then granulated in conventional fashion through a fine-mesh screen. The granulate is then dried, admixed with the magnesium stearate, and the resulting composition is compressed into 80 mgm.-tablets in a conventional tablet making machine. Each tablet contains 15 mgm. of the imidazopyrimidine compound and is an oral dosage unit composition with effective hypotensive action.

EXAMPLE 32

Coated pills

The pill core composition is compounded from the following ingredients:

| | Parts |
|---|---|
| 6 - ethyl - 8 - (2'6' - dichloro-phenyl) - 7 - dimethylamino - 2,3 - dihydro-7-oxo-imidazo[1,2-a]pyrimidine | 15 |
| Lactose | 33 |
| Corn starch | 30 |
| Colloidal silicic acid | 1 |
| Magnesium stearate | 1 |
| Total | 80 |

Preparation.—The ingredients are compounded and granulated as described in the preceding example, and the finished composition is compressed into 80 mgm.-pill cores which are then coated in conventional manner with a thin shell consisting essentially of a mixture of talcum and gum arabic, and finally polished with beeswax. Each coated pill contains 15 mgm. of the imidazopyrimidine compound and is an oral dosage unit composition with effective hypotensive action.

Analogous results are obtained when any one of the other imidazopyrimidines embraced by formulas I and Ia or a non-toxic acid addition salt thereof is substituted for the particular imidazopyrimidine in Examples 31 and 32. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

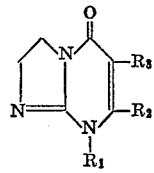

or

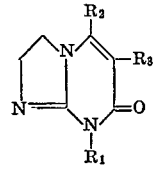

wherein
$R_1$ is

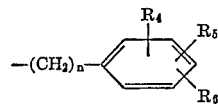

where
$n$ is 0 or 1, and
$R_4$, $R_5$ and $R_6$, which may be identical to or different from each other, are each methyl, ethyl, fluorine, chlorine, bromine, trifluoromethyl, cyano, methoxy or hydrogen,
one of $R_2$ and $R_3$ is

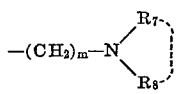

where
$m$ is an integer from 0 to 3, inclusive,
$R_7$ is hydrogen or lower alkyl,
$R_8$ is lower alkyl, and
$R_7$ and $R_8$, together with each other and the nitrogen atom to which they are attached, are piperidino, piperazino, morpholino or pyrrolidino,
and the other of $R_2$ and $R_3$ is methyl or ethyl,
or a non-toxic, pharmacologically acceptable acid addition salt thereof.

2. A compound of claim 1, which is 6-ethyl-8-(2',6'-dichloro-phenyl)-5-dimethylamino-2,3-dihydro - 7 - oxo-imidazo[1,2-a]pyrimidine or a non-toxic, pharmacologically acceptable acid addition salt thereof.

3. A compound of claim 1, which is 6-ethyl-8-(2',6'-dichloro-phenyl)-7-dimethylamino-2,3-dihydro - 5 - oxo-imidazo[1,2-a]pyrimidine or a non-toxic, pharmacologically acceptable acid addition salt thereof.

References Cited

UNITED STATES PATENTS 3,244,717   4/1966   Wagner   260—256.4

DONALD G. DAUS, Primary Examiner

R. V. RUSH, Assistant Examiner

U.S. Cl. X.R.

260—247.1, 247.2 A, 247.2 B, 293.88, 309.6, 326.3; 424—248, 251

PO-1050
(5/69)

UNITED STATES PATENT OFFICE
CERTIFICATE OF CORRECTION

Patent No. 3,816,422　　　　　　　Dated June 11, 1974

Inventor(s) HELMUT STÄHLE, HERBERT KÖPPE, WERNER KUMMER, WOLFGANG HOEFKE

It is certified that error appears in the above-identified patent and that said Letters Patent are hereby corrected as shown below:

Col. 1 line 4, "Stahle" should read

-- Stähle" --

Col. 4 line 14, after "hydroiodic acid" insert:

-- hydrofluoric acid, sulfuric acid, phosphoric acid, nitric acid --

Col. 6 line 8, that portion of the formula which now reads

" 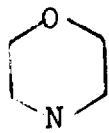 "　　should read

-- 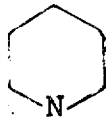 --

Col. 13 line 35, "7-oxo" should read

-- 5-oxo --

Signed and sealed this 5th day of November 1974.

(SEAL)
Attest:

McCOY M. GIBSON JR.　　　　　　　C. MARSHALL DANN
Attesting Officer　　　　　　　　Commissioner of Patents